United States Patent
Smoyer et al.

(10) Patent No.: US 7,893,818 B2
(45) Date of Patent: Feb. 22, 2011

(54) SYSTEM AND METHOD FOR COMMUNICATING VEHICULAR INFORMATION WITH A REMOTE LOCATION

(75) Inventors: Clinton J. Smoyer, Raymore, MO (US); Shane M. Smith, Paola, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 338 days.

(21) Appl. No.: 11/656,708

(22) Filed: Jan. 23, 2007

(65) Prior Publication Data
US 2008/0176537 A1 Jul. 24, 2008

(51) Int. Cl.
*B60R 25/10* (2006.01)

(52) U.S. Cl. .............................. 340/426.12; 340/426.11; 340/426.13; 340/539.1; 455/99

(58) Field of Classification Search .............. 340/426.2, 340/425.5, 426.1, 429, 426.11, 426.12, 426.13, 340/426.16, 426.22, 426.17, 438, 539.1; 455/414.1, 99
See application file for complete search history.

(56) References Cited

U.S. PATENT DOCUMENTS

| | | | | |
|---|---|---|---|---|
| 5,513,244 | A * | 4/1996 | Joao et al. | 455/404.1 |
| 6,163,251 | A * | 12/2000 | Escareno et al. | 340/426.21 |
| 6,480,098 | B2 * | 11/2002 | Flick | 340/7.2 |
| 6,717,511 | B2 * | 4/2004 | Parker et al. | 340/426.12 |
| 6,956,467 | B1 * | 10/2005 | Mercado, Jr. | 340/426.2 |
| 2004/0100368 | A1 * | 5/2004 | Lobaza et al. | 340/436 |
| 2007/0005201 | A1 * | 1/2007 | Chenn | 701/29 |

* cited by examiner

*Primary Examiner*—Anh V La
(74) *Attorney, Agent, or Firm*—SNR Denton US LLP

(57) ABSTRACT

A system and method for communicating vehicular information with remote locations may include communicating data from a wireless interface of a vehicle with a locally positioned wireless device. The wireless device may be configured to enable a user to communicate with other users of wireless devices. Receipt of the internal signal may cause the wireless device to communicate the data to a remote location. The remote location may be a service provider or public safety organization located on a network, such as the public switched telephone network or wireless communications network (e.g., mobile telephone network).

23 Claims, 5 Drawing Sheets

SYSTEM AND METHOD FOR COMMUNICATING VEHICULAR INFORMATION WITH A REMOTE LOCATION

BACKGROUND

Vehicular safety has evolved from conventional seatbelts and airbags to include wireless communications for a passenger or vehicle to notify a service provider of an event, such as a medical emergency, vehicular accident, or requesting directions. One such communication system is commonly known as OnStar®. The OnStar® vehicular communication system is integrated into a vehicle and uses a mobile communication system to contact a service provider and a global positioning system (GPS) technology to report position of the vehicle when contacting the service provider. This communication system enables the service provider to remotely control certain aspects of the vehicle as well, including unlocking doors. Generally, use of the OnStar® communications system includes an initial purchase payment and monthly service fees.

There are a number of problems with the OnStar® communications system. One such problem is that the OnStar® communications system is currently limited to General Motors' vehicles. While the OnStar® communications system is useful for a variety of safety and informational purposes, the system is limited to General Motors' vehicles and not easily uninstalled from one vehicle and reinstalled in a different vehicle. In other words, an individual or family concerned with safety would need to purchase General Motors vehicles with OnStar® communications systems for each currently-owned, and most likely, future owned vehicle. Because of these limitations, widespread use of the communications system has not occurred.

SUMMARY

To overcome the limitations of existing vehicular communications systems that provide safety to passengers, the principles of the present invention provide for a vehicle communications system that communicates with a remote location via a wireless device that a user may utilize as a personal communicator. For example, the wireless device may be a mobile telephone and communicate with the vehicle communications system using a local wireless communications interface, such as Bluetooth® or WiFi®.

One system in accordance with the principles of the present invention includes a system for communicating vehicular information with a remote location. This system may include a computing unit in communication with at least one component of the vehicle. A wireless interface may be in communication with the computing unit and be configured to communicate a wireless signal with a locally positioned wireless device. The wireless device may include a user interface to enable a user to communicate with other users of wireless devices. The computing unit may further be configured to receive data from the component(s) of the vehicle and communicate data in an internal signal via the wireless interface to the wireless device to cause the wireless device to communicate the internal signal data to a remote location. The wireless device may be a mobile telephone. The wireless interface may be configured to transmit a wireless signal using Bluetooth and/or WiFi communications protocols. The component(s) of the vehicle may include a collision sensor, airbag sensor or other sensor utilized to detect that a collision of the vehicle has occurred. In addition, the computing unit may further be configured to receive an external signal from the wireless device and wireless interface and communicate the data contained in the external signal to the component(s) in the vehicle. The external signal may be generated by the remote location and communicated via the wireless device or generated by the wireless device and communicated to the computing unit. In one embodiment, data received in the external signal may cause the processing unit to disable the vehicle. Alternatively, the data may cause the computing unit to unlock a door of the vehicle. In addition, the computing unit may be configured to communicate a message to the wireless device for display of the message to the user.

One embodiment of a process in accordance with the principles of the present invention includes communicating vehicular information with remote locations. The process may include communicating data in an internal signal from a wireless interface of a vehicle with a locally positioned wireless device. The wireless device may be configured to enable a user to communicate with other users of wireless devices. Receipt of the internal signal may cause the wireless device to communicate the data to a remote location. The remote location may be a service provider or public safety organization located on a network such as the public switched telephone network or wireless communications network (e.g., mobile telephone network).

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
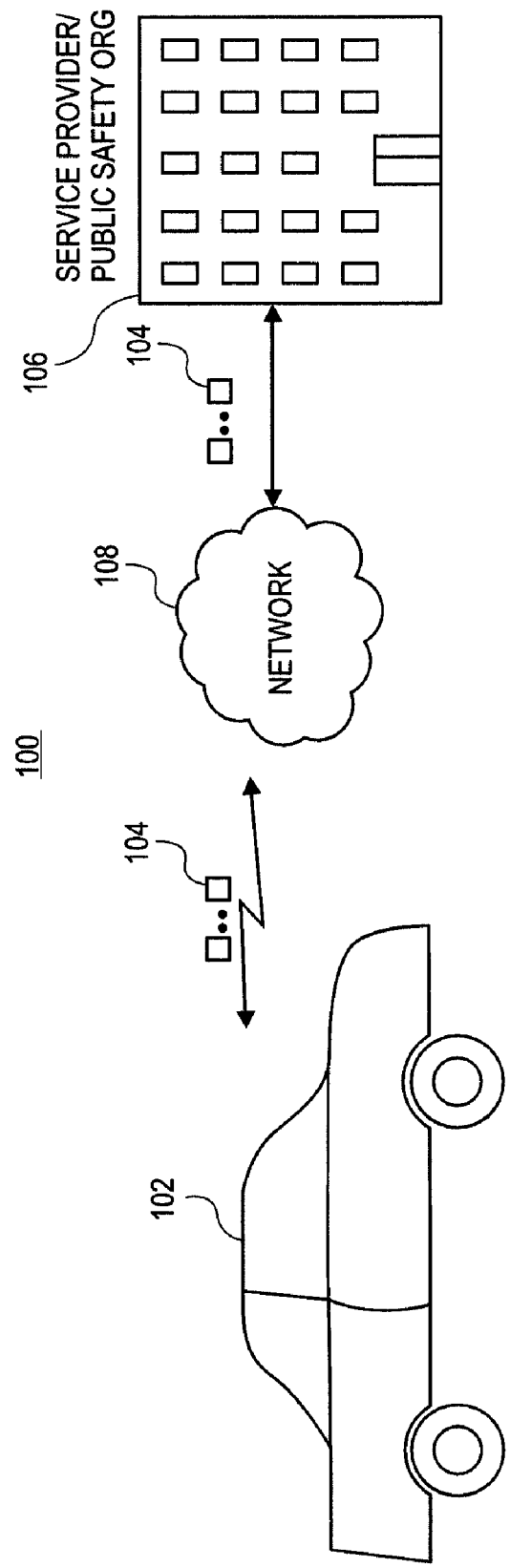
FIG. 1 is an illustration of an exemplary environment in which vehicular communications with a remote location are performed in accordance with the principles of the present invention.

FIG. 1 is an illustration of an exemplary environment 100 in which vehicular communications with a remote location are performed in accordance with the principles of the present invention. Information generated by a vehicle 102 may be communicated as data 104 to a service provider or public safety organization 106 via a network 108. The network 108 may be a telecommunications network, the Internet, or other network to which the service provider or public safety organization 106 is in communication. The information communicated from the vehicle 102 may be event-triggered, where an event may include a collision, deployment of an airbag, failure of a vehicle component, user activated communication, information reporting, and the like. The service provider may be a commercial organization that functions to receive and respond to vehicle information communicated thereto. In addition, the service provider may generate and communicate information to the vehicle. A public safety organization may be police, fire, ambulance or other service that is typically understood to be available for public safety purposes.

Figure 2:
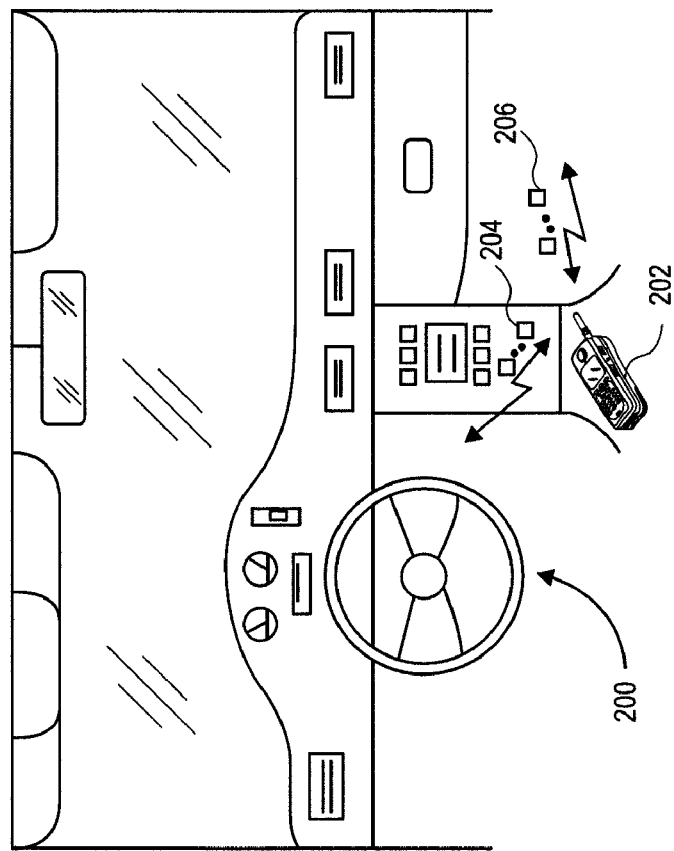
FIG. 2 is an illustration of an exemplary internal compartment in which a wireless device communicates with a wireless interface.

FIG. 2 is an illustration of an exemplary internal compartment 200 in which a wireless device 202 communicates with a wireless interface (not shown). To enable manufacturers to provide vehicle information and control on a more widely used basis and at less cost then conventional vehicle communications systems, the vehicle control and communication system may provide for a wireless interface (not shown) that communicates with the wireless device 202 via a wireless signal 204. The wireless signal 204 may be communicated via a local wireless communications protocol, such as Bluetooth® or WiFi®. Other local or short range (e.g., 300 feet or less) communications protocols may be utilized in accordance with the principles of the present invention. The wireless device 202 may be a mobile telephone or other personal communicator of which a user may utilize for communicating with other users of wireless devices. In other words, the wireless device 202 may be any personal communicator that is configured to provide personal communications and is also configured to receive wireless communications having the wireless communications protocol utilized by a vehicle control and communications system 303 (See FIG. 4). Generally, the wireless communications protocol that the vehicle command and communications system 303 utilizes is one that is widely utilized in mobile telephone communications. The wireless device 202, in response to receiving a wireless communication from the control and communication system 303 of the vehicle, may communicate the information received to a wireless network (e.g., network 108 of FIG. 1) for communication of the information to a service provider. By using a wireless device for handling communications, the user may pay for wireless device services and less, per use, or not at all for communications for the vehicular communications. Additionally, the equipment cost for the system may be reduced due to not having cellular communication equipment and being more widely installed by different vehicle manufacturers.

Figure 3:
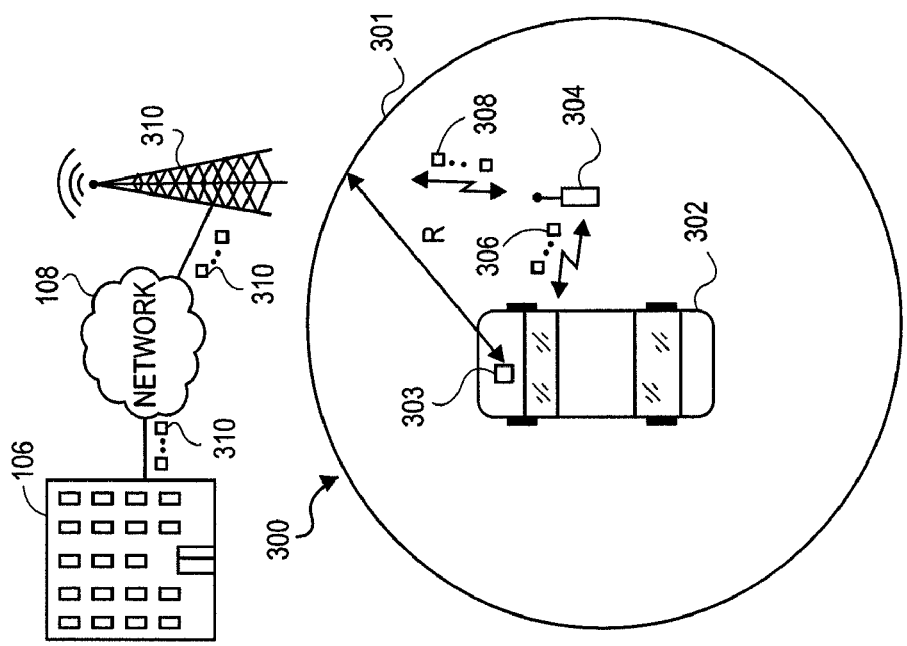
FIG. 3 is an illustration of a top view of a local area of a vehicle in which a wireless device is located.

FIG. 3 is an illustration of a top view of a local area 300 of a vehicle 302 in which a wireless device 304 is located. As shown, a circle 301 having a radius R is drawn around the vehicle 302. This radius R is a maximum distance at which the vehicle control and communications system 303 may communicate with the wireless device 304. If the command and communications system 303 of the vehicle uses the Bluetooth® communications protocol, the Radius is approximately 30 feet, and, if using the WiFi® communications protocol, the Radius is approximately 100 feet. It should be understood that additional power may be utilized to have a larger radius from these or other protocols, but the wireless device 304 is considered to be local if within communication range of the control and communications system 303 of the vehicle 302.

As shown, a signal 306 maybe communicated from the control and communications system 303 to the wireless device 304. In response, the wireless device 304 may communicate the information contained in the signal 306 via a signal 308 to a local receiving station 310 for communication of the information to the service provider or public safety organization 106 via network 108.

Figure 4:
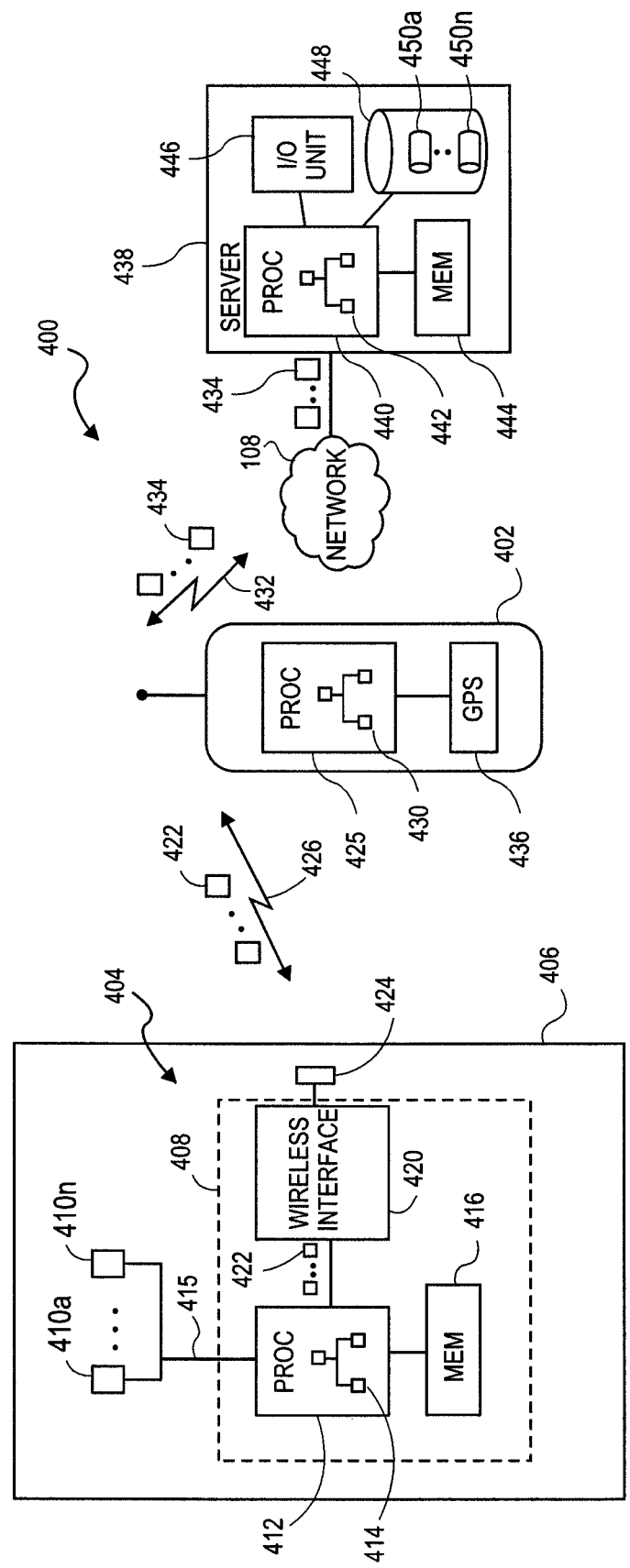
FIG. 4 is an illustration of an exemplary system in which a wireless device communicates with a controlling communications system of a vehicle.

FIG. 4 is an illustration of an exemplary system 400 in which a wireless device 402 communicates with a sense and control system 404 of a vehicle 406. The vehicle 406 may include a control and communications system 408 that is in communication with one or more components 410a-410n (collectively 410). The components 410 may be sensors, switches, controllers, air bags, ignition or any other device contained within the vehicle 406. The control and communications system 408 may include a processor 412 that executes software 414. The software 414 may be configured to receive signals 415 from the component(s) 410 and respond accordingly. A memory 416 may be connected to the processor 412 for storing data and/or software. The processor 412 may further be in communication with a wireless interface 420 for communicating data 422 to the wireless device 402. The wireless interface 420 may be configured to receive the data 422 and communicate the data 422 via one or more communications protocols to the wireless device 402 via an antenna 424 over a wireless channel 426.

The wireless device 402 may include a processor 428 that executes software 430. The software 430 may be configured to perform conventional wireless communications to enable a user to communicate with other users of wireless devices (e.g., mobile telephones) or fixed location devices (e.g., telephones located on the public switched telephone network (PSTN)). In addition, the software 430 may be configured to detect a communication from the control and communications system 408 and communicate the data 422 received therefrom to the network 108 via the wireless communications channel 432. The wireless communications channel 432 may be a code division multiple access (CDMA) communications protocol, global system for mobile (GSM) communications protocol, or any other wireless communications protocol as understood in the art. Data 434 communicated from the wireless device 402 may be the same as the data 422 or be altered to include additional information, such as coordinate information as generated by a global positioning system (GPS) 436 located within the wireless device 402. It should be understood that the data 434 may also remove or add information utilized for delivering the data 434 to a proper location on the network 108.

A server 438 that is utilized by a service provider or public safety organization may include a processor 440 that executes software 442. The software 442 may be configured to receive the data 434 and notify the service provider or communicate information to a public safety organization, either by a data communication or voice communication (e.g., automatically establishing a telephone call between an operator and public safety organization). A memory 444 may be in communication with the processor 440 for storing data and/or software. An input/output (I/O) unit 446 may also be in communication with the processor 440 for communicating information to remote locations, such as to the control and communications system 408. A storage unit 448 may be in communication with the processor 440 and include one or more data repositories 450a-450n (collectively 450) for storing information, such as communication history with vehicles, subscriber lists, and any other information utilized to enable the service provider to communicate with and maintain records of subscribers or participants of a communications program.

Figure 5:
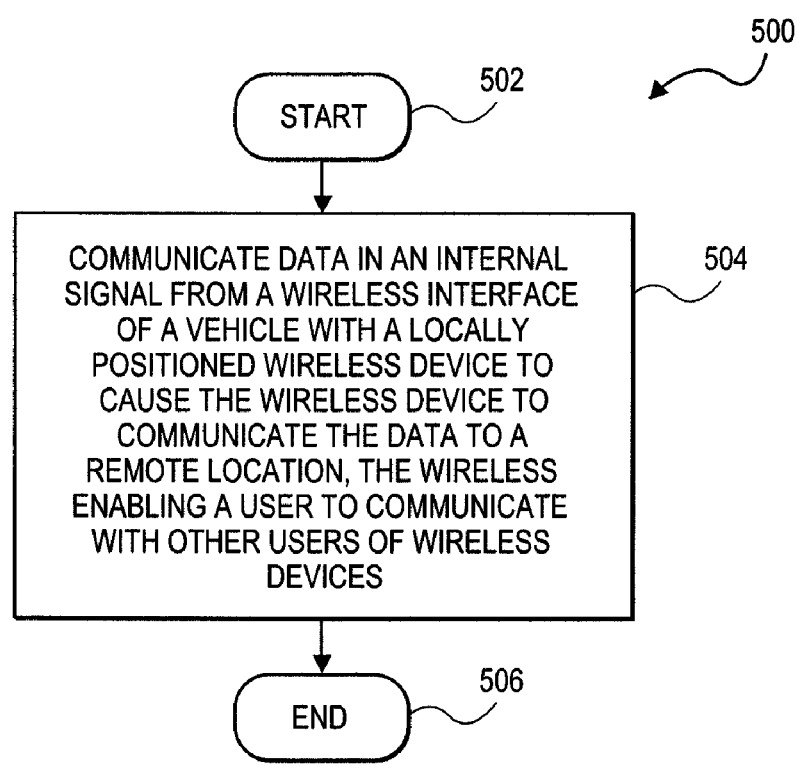
FIG. 5 is a flow diagram of an exemplary process in accordance with the principles of the present invention.

FIG. 5 is a flow diagram of an exemplary process in accordance with the principles of the present invention. The process 500 starts at step 502. At step 504, data in an internal signal (i.e., a signal generated at the vehicle) may be communicated from a wireless interface of a vehicle with a locally positioned wireless device to cause the wireless device to communicate the data to a remote location. The data may be data generated by a component within the vehicle, such as an airbag sensor, and used to notify a service provider of a collision, for example. In addition, information generated by a service provider may be communicated to the vehicle. The wireless device may enable a user to communicate with other users of wireless devices. The process stops at step 506.

Figure 6:
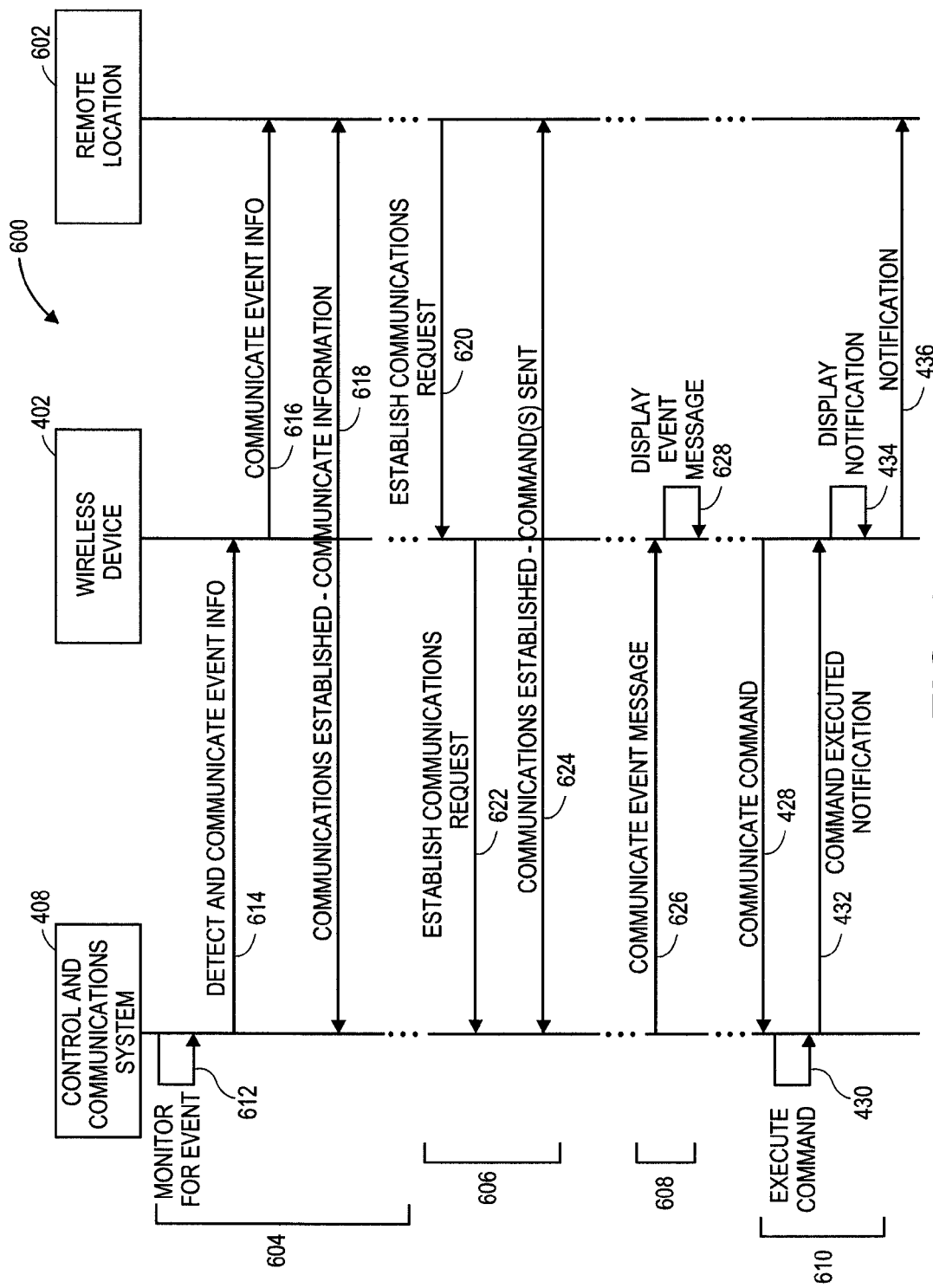
FIG. 6 is a communication diagram of different processes that may be performed for communicating vehicle information and controlling the vehicle in accordance with the principles of the present invention.

FIG. 6 is a communication diagram of different processes 600 that may be performed for communicating vehicle information and controlling the vehicle in accordance with the principles of the present invention. Four exemplary processes 604, 606, 608 and 610 are shown. The process 604 illustrates a process that monitors for events at a vehicle and notifies a remote location 602 via the wireless device 402 of an event. Process 606 illustrates a process that communicates information from the remote location 602 to a vehicle via the wireless device 402. Process 608 illustrates a process that communicates information from the vehicle to the wireless device 402 for notification to the user. Process 610 illustrates a process of a command by a user of the wireless device 402 to the control and communications system 408.

The process 604 starts at step 612, where the control communications system 408 monitors for an event at the vehicle. The event may be generated by a component (e.g., sensor or processing unit) of the vehicle or person within the vehicle requesting a communication being established with the remote location 602 by pressing a push-button, for example. The remote location 602 may be a service provider, public safety organization, or automated interactive service (e.g., automated system using interactive voice response for providing directions or other information). At step 614, the control and communications system 408 detects and communicates event information to the wireless device 402 that is locally positioned relative to the control and communications system 408. The wireless device 402, in response, communicates event information at step 616 to the remote location 602. The remote location 602, in response to receiving the event information may establish communications and communicate information back to the control and communications system 408 via the wireless device 402. At step 618, communication of information from the remote location 602 to the control and communications system 408 may include any type of communication, including status requests, status report, voice communications to an operator or passenger of a vehicle, unlock door command, start or stop vehicle command, or any other communication for detecting or controlling vehicle operation or providing information to a user within the vehicle. Still yet, the information communicated from the remote location 602 to the control and communications system 408 at step 618 may be utilized to cause at least one component of the vehicle to engage or disengage. For example, a communication may be sent to attempt to open one or more windows of the vehicle.

The process 606 may be initiated by the remote location 602 requesting to establish communications with the control and communications system 408. The request at step 620 may be communicated to the wireless device 402 for communication to the control and communications system 408 at step 622. In response to the control and communications system 408 receiving the communications request at step 622, the control and communications system 408 may establish communications with the remote location 602 via the wireless device 402 at step 624. Once established, command(s) may be sent from the remote location 602 to the control and communications system 408 via the wireless device 402. The command(s) may be any command to control a component within the vehicle or request information from the control and communications system 408. For example, an operator of the vehicle may call the remote location 602 to request that an operator at the remote location 602 unlock the doors of a vehicle in the event of the operator inadvertently leaving the keys within the vehicle. As another example, an operator of the vehicle may be concerned about proper functioning of the vehicle and request that an operator at the remote location 602 perform a remote test of components of the vehicle to determine if there is a failure of a component of the vehicle (e.g., timing problem within the motor). In the event that a vehicle is stolen or, embarrassingly, misplaced, a user may contact the remote location 602 and a command to disable the vehicle may be communicated via the wireless device 402 and determination of coordinates of the vehicle may be performed by requesting location from a GPS device within the wireless device local to the vehicle. It should be understood that, in accordance with the principles of the present invention, the wireless device 402 is locally positioned with respect to the control and communications system 408.

The process 608 may be initiated by the control and communications system 408 communicating an event message at step 626 to the wireless device 402. At step 628, the message may be displayed on the wireless device 402 for the operator. In one embodiment, the message may be notification to the operator that a service maintenance is due. Alternatively, the event message maybe notice of a problem with a component of the vehicle (e.g., low oil). It should be understood that any message that the control and communications system 408 may wish to notify an operator of the vehicle may be communicated to the wireless device 402 when in local proximity of the control and communication system 408. The message may be that of a text message or instant message, as understood in the art.

A process 610 may be initiated by an operator of the wireless device 402 who may utilize the wireless device 402 for communicating a command at step 428. At step 430, the command received by the control and communications system 408 may be executed. A command executed notification may be communicated from the control and communications system 408 to the wireless device 402 at step 432. At step 434, the notification may be displayed by the wireless device 402 to notify the user that the command was executed by the control and communications system 408. Optionally, at step 436, notification of the command communicated by the wireless device 402 to the control and communications system 408 may be communicated to the remote location 602 for notification to an operator. One example of a command that may be communicated from the wireless device 402 to the control and communications system 408 may be an emergency vehicle disable command to disable the vehicle. Such a command may be issued by the user of the wireless device 402 in the event of a carjacking, for example, where the control and communications system 408 may disable the vehicle from further operation. This command may be communicated through the use of a special push button on the wireless device 402 that communicates a disable signal to the control and communications system 408 or by the wireless device 402 being utilized to place a telephone call to itself and accessing a voice menu that enables the user to selectively disable the vehicle. However, because of an emergency situation, such as a carjacking, the user will need to communicate with the control and communications system 408 in a fairly immediate fashion before the vehicle is outside the range of the wireless device. The notification at step 436 to the remote location 602 may include notification of the command and include coordinates of the user so that the remote location 602 may direct a public safety organization to respond to that location. Software of the control and communications system 408 may immediately respond to the command or respond to the command in a delayed manner so that the user 402 may escape from harms way. For example, a timer may be used to disable the vehicle 30 seconds after the command being communicated from the wireless device 402 to the control and communications system 408 at step 428.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for communicating vehicular information with a remote location, said system comprising:
   a computing unit in communication with at least one component of a vehicle; and
   a wireless interface in communication with said computing unit and configured to communicate a wireless signal with a locally positioned wireless device, the wireless device including a user interface to enable a user to communicate with other users of wireless devices, said computing unit further configured to receive data from the at least one component of the vehicle and communicate the data in an internal signal via said wireless interface to the wireless device to cause the wireless device to communicate the data to the remote location, said computing unit being further configured to receive an external signal from the remote location via the wireless device and said wireless interface, and communicate data contained in the external signal to the at least one component of the vehicle, the external signal including data to cause said computing unit to alter the at least one component of the vehicle, the at least one component of the vehicle being an electromechanical component, the data of the external signal further causing said computing unit to disable the vehicle, the wireless device being configured with a mechanism configured to cause the wireless device to communicate a disable signal to the wireless interface to cause said computing unit to disable the vehicle a predetermined amount of time after the external signal is received.

2. The system according to claim 1, wherein the wireless device is a mobile telephone.

3. The system according to claim 1, wherein said wireless interface is configured to transmit a wireless signal using at least one of a Bluetooth® and WiFi® communications protocol.

4. The system according to claim 1, wherein the at least one component of the vehicle is a collision sensor and the internal signal data is indicative of the collision sensor sensing a collision.

5. The system according to claim 1, wherein the data of the external signal causes said computing unit to unlock a door of the vehicle.

6. The system according to claim 1, wherein the wireless device is configured to communicate with a network to which the remote location is in communication.

7. The system according to claim 1, wherein the remote location includes a service provider.

8. The system according to claim 1, wherein said computing unit is configured to communicate a message to the wireless device for display of the message to a user thereof.

9. The system according to claim 1, wherein the locally positioned wireless device is within 100 feet of the vehicle.

10. The system according to claim 1, further comprising a voice menu configured to enable a user to selectively disable the vehicle.

11. A method for communicating vehicular information with a remote location, said method comprising:
    communicating data from a wireless interface of a vehicle with a locally positioned wireless device, the wireless device configured to enable a user to communicate with other users of wireless devices, an internal signal causing the wireless device to communicate the data to the remote location;
    receiving an external signal from the wireless device;
    communicating data contained in the external signal generated by the remote location and communicated via the wireless device to at least one component in the vehicle to cause the at least one component in the vehicle to be altered; and
    in response to a user selecting a mechanism, receiving a disable signal by the wireless interface to cause the vehicle to become disabled a predetermined amount of time after the external signal is received.

12. The method according to claim 11, wherein communicating with the locally positioned wireless device includes communicating with a mobile telephone.

13. The method according to claim 11, wherein communicating includes communicating using at least one of a Bluetooth® and WiFi® communications protocol.

14. The method according to claim 11, further comprising receiving data from at least one component of the vehicle.

15. The method according to claim 14, wherein receiving data from at least one component of the vehicle includes receiving data that is indicative of a collision by the vehicle.

16. The method according to claim 11, wherein receiving the external signal includes receiving data causing at least one electromechanical component of the vehicle to be altered.

17. The method according to claim 11, further comprising disabling the vehicle in response to receiving the data of the external signal.

18. The method according to claim 11, further comprising unlocking a door of the vehicle in response to receiving the data of the external signal.

19. The method according to claim 11, wherein communicating the data with the wireless device causes the wireless device to communicate with a network to which the remote location is connected.

20. The method according to claim 11, wherein communicating the data with the wireless device causes the wireless device to communicate with a public safety organization.

21. The method according to claim 11, wherein communicating the data with the wireless device causes the wireless device to display a message to the user.

22. The method according to claim 11, wherein communicating includes broadcasting the data within approximately 100 feet of the vehicle.

23. The method according to claim 11, further comprising generating a voice menu to enable a user to selectively disable the vehicle.

* * * * *